(No Model.)
E. H. EVE.
ARTIFICIAL FRUIT, FOLIAGE, AND FLOWERS.
No. 363,736. Patented May 24, 1887.
FIG. I.
FIG. II.
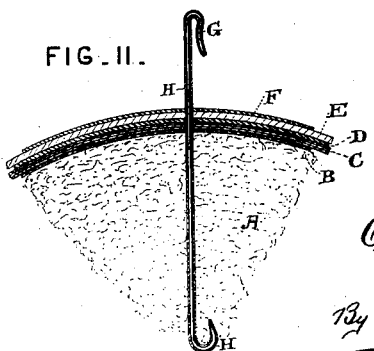
Attest:
Geo. T. Smallwood.
Walter Allen
Inventor:
Emma H. Eve
By Knight Bros.
Attys

UNITED STATES PATENT OFFICE.

EMMA H. EVE, OF LOCKHART, TEXAS.

ARTIFICIAL FRUIT, FOLIAGE, AND FLOWERS.

SPECIFICATION forming part of Letters Patent No. 363,736, dated May 24, 1887.

Application filed March 23, 1887. Serial No. 232,167. (No model.)

*To all whom it may concern:*

Be it known that I, EMMA H. EVE, a citizen of the United States, residing at Lockhart, in the county of Caldwell and State of Texas, have invented an Improvement in Artificial Fruit, Foliage, and Flowers, of which the following is a specification.

My invention relates to the method of producing artificial fruit, foliage, and flowers; and it also relates to the article produced.

In carrying out my invention as applied to artificial fruit, I proceed as follows: With the round fruits I take the circumference of a natural specimen—an apple, for instance—by means of a string, and after doubling the string a circle is drawn on white lace or netting and a blank cut out. Little seams are taken up in the lace all round until the blank is caused to assume the form of an oval bag. The bag is next stuffed with cotton or white wool. When it is half full a wire stem is inserted, the stem having been previously wrapped with tissue-paper the color of the natural stem, with the end hooked over, so that it will be anchored in the cotton or wool, so as not to pull out of the latter. Stuffing of the bag is continued round and round the stem until it is tight. Then the lace is gathered all round with needle and thread and drawn up close and tight to the stem. If there should be found to be any fullness at the stem, the gathers are stroked in and more seams are overcast until there is not a wrinkle. The cotton is next picked up through the meshes of the lace with a needle until every part looks plump and round. When every part looks smooth and fruit-like in shape, I cut narrow strips of tissue-paper of the shade of the natural fruit, and paste it on the lace or netting with gum-arabic, letting each strip lap a little. When the article has been covered all round, it is hung up on a line by a hook formed on the stem until it is dry, when it is covered and allowed to dry in a similar manner a second and third time. These series of coverings form a stiff pasteboard, and are perfectly smooth if carefully applied. The whole being quite dry, I paint it with water-colors, imitating the natural fruits in tints. When the coloring is dry, the article is sunk into a bath of pure white wax heated to a point beneath boiling. The article is next drawn up slowly out of the hot wax, letting the superfluous wax drain off, and thus leave a thin coating on the article to impart to it a waxy fruit-like look. A pretty pink blush is given to each side of fruit with dry carmine and a dry brush.

With angular fruit—such as banana—I procure a pattern by cutting the peeling from the natural fruit, following the chords. Lay each piece of peeling on white lace or netting and cut the lace or netting out, leaving room for seams all round. Thus four pieces will be obtained corresponding to the four sides of the fruit. These pieces are fitted together in the same position they were taken from the fruit and stitched neatly together, forming an oblong flat sided bag, which is next turned inside out and stuffed with cotton or wool, a little at a time, until it is quite tight. A pasteboard covering is then applied in the same manner as hereinbefore described for covering round fruit; but as this fruit is represented without a stem there is not anything by which it can be held conveniently, so that only two sides of the covering are applied at a time. The covering should not be dried by direct heat, or it will wrinkle and spoil the work. I am careful to select a pretty banana-colored tissue-paper as the covering material. The article is painted here and there with little spots of burnt umber as it looks on the natural fruit. When it is perfectly dry, one half is dipped in the hot wax, and when that half is cold it is turned up and the other half dipped to where the line of wax extends.

To make the foliage of both fruit and flowers, I always cut my patterns from nature, using yellow wrapping-paper. I find by experiment that this paper will take up coloring readily.

For coloring foliage I mix the different shades of powdered paint with pure wax. For dark green, mix equal parts of chrome-green and chrome-yellow, one ounce each, with four ounces of wax. For a lighter shade of green, one-third of chrome-green to two-thirds of yellow. For autumn leaves, two ounces of vermilion to three ounces of hot wax will form a bright red tint for the leaves. For yellow-tinted leaves, two ounces of chrome-yellow to three ounces of wax. For a dark-red foliage, stir a little burnt umber in with the vermilion. After the leaves are cut out of the paper they can be creased with the finger-nail and strung on wrapped wire and each dipped in the hot wax, using the desired shade. All the flowers are cut out from natural specimens, using unruled thick white paper for thick rich-looking petals and the different shades of tissue-paper for the more delicate specimens. I make all my stamens of either thread or wire. All the flowers are dipped in white wax, just as the fruit is. If the flower is colored, it is painted before being dipped in the hot wax.

In order that my invention may be fully understood, I will proceed to describe it with reference to the accompanying drawings, in which—

Figure I is a side elevation of an arrangement of fruit, with flowers and foliage embodying my invention, a portion of the round fruits being removed. Fig. II is a section of the removed portion on a large scale.

A is the cotton or wool; B, the lace or netting; C, the gummed strips of paper forming the pasteboard covering; D, the layer of paint; E, the layer of wax; F, the paint finish, and G the hooked stem, having paper covering H.

Having thus described my invention, the following is what I claim as new therein and desire to secure by Letters Patent:

1. The method herein described for the production of artificial fruit, which consists in cutting out a piece of lace or netting of the desired shape, forming the lace or netting into a bag, stuffing the bag with cotton or wool, or its equivalent, picking the cotton or wool up through the meshes of the lace or netting, cutting narrow strips of tissue-paper, and applying them in layers until a covering similar to pasteboard is formed, drying the article, painting the article, sinking the article in a bath of wax heated to a point beneath boiling, drawing the article slowly out of the bath and letting it drain off, and finally applying a paint finish.

2. The method herein described for the production of artificial fruit, which consists in cutting out a piece of lace or netting of the desired shape, taking up little seams in the lace or netting until the blank is caused to assume the form of an oval bag, stuffing the bag with cotton or wool, or its equivalent, until half full, taking a wire stem hooked at both ends, inserting one end of the stem in the cotton or wool, continuing the stuffing of the bag around the stem until tight, gathering the lace or netting all around close up to the stem, picking up the cotton or wool through the meshes of the lace or netting until every part looks plump and round, cutting narrow strips of tissue-paper and applying them in layers until a covering similar to pasteboard is provided, painting the covering, dipping the article in a bath of hot wax, and finally applying a paint finish.

3. Artificial fruit comprising a filling, A, of cotton, wool, or its equivalent, lace or netting B, through which the filling projects, the layers of strips C, forming a pasteboard covering, layer of paint D, coat of wax E, and paint finish, substantially as described.

EMMA H. EVE.

Witnesses:
SIDON HARRIS,
LUCY HARRIS.